United States Patent
Lin et al.

(10) Patent No.: US 12,489,379 B2
(45) Date of Patent: Dec. 2, 2025

(54) SELF-DRIVEN POWER GENERATION MODULE AND MANUFACTURING METHOD THEREOF

(71) Applicant: SAN FANG CHEMICAL INDUSTRY CO., LTD., Kaohsiung (TW)

(72) Inventors: Chih-Yi Lin, Kaohsiung (TW); Kuo-Kuang Cheng, Kaohsiung (TW); Kao-Lung Yang, Kaohsiung (TW); I-Ju Wu, Kaohsiung (TW); Pin-Hsien Sung, Kaohsiung (TW); Ying-Chih Lai, Taipei (TW); Yung-Chi Hsiao, Taichung (TW)

(73) Assignee: SAN FANG CHEMICAL INDUSTRY CO., LTD., Kaohsiung (TW)

( * ) Notice: Subject to any disclaimer, the term of this patent is extended or adjusted under 35 U.S.C. 154(b) by 213 days.

(21) Appl. No.: 18/413,626

(22) Filed: Jan. 16, 2024

(65) Prior Publication Data
US 2024/0250621 A1    Jul. 25, 2024

(30) Foreign Application Priority Data
Jan. 19, 2023    (TW) ................. 112102578

(51) Int. Cl.
*H02N 1/04*    (2006.01)
(52) U.S. Cl.
CPC ..................... *H02N 1/04* (2013.01)
(58) Field of Classification Search
CPC ........................................ H02N 1/04
(Continued)

(56) References Cited

U.S. PATENT DOCUMENTS

| | | | |
|---|---|---|---|
| 2014/0000679 A1* | 1/2014 | Ahn | H10F 19/80 257/E31.117 |
| 2014/0292138 A1* | 10/2014 | Wang | H02N 1/04 310/300 |

(Continued)

FOREIGN PATENT DOCUMENTS

| | | |
|---|---|---|
| CN | 103368447 A | 10/2013 |
| CN | 104467514 A | 3/2015 |

(Continued)

OTHER PUBLICATIONS

"Self-driven" common meaning (Year: 2025).*
(Continued)

*Primary Examiner* — Ahmed Elnakib
(74) *Attorney, Agent, or Firm* — WPAT, PC

(57) ABSTRACT

A self-driven power generation module and a manufacturing method thereof are provided. The self-driven power generation module includes an upper structure, a lower structure, and a charge accumulation layer. The upper structure includes a first encapsulating layer, a first supporting layer, and a first electrode layer. The first supporting layer contacts the first encapsulating layer. The first electrode layer contacts the first supporting layer. The lower structure is spaced apart from the upper structure. The lower structure includes a second encapsulating layer, a second supporting layer, a second electrode layer, a third supporting layer, and a third electrode layer. The third supporting layer is disposed on the second encapsulating layer and spaced apart from the second supporting layer. The third electrode layer is disposed on the third supporting layer. The charge accumulation layer is disposed between the upper structure and the lower structure.

10 Claims, 8 Drawing Sheets

(58) Field of Classification Search
USPC .................................................. 310/309, 310
See application file for complete search history.

(56) References Cited

U.S. PATENT DOCUMENTS

| | | | | |
|---|---|---|---|---|
| 2015/0061460 A1* | 3/2015 | Bae | ........................ | H02N 1/04 |
| | | | | 977/948 |
| 2016/0036351 A1* | 2/2016 | Kim | ........................ | H02N 1/04 |
| | | | | 73/514.32 |
| 2021/0208121 A1* | 7/2021 | Su | ..................... | G01N 33/0047 |

FOREIGN PATENT DOCUMENTS

| | | | | |
|---|---|---|---|---|
| CN | 106026758 A | | 10/2016 | |
| CN | 107769607 A | | 3/2018 | |
| CN | 108418473 A | | 8/2018 | |
| CN | 112234867 A | | 1/2021 | |
| JP | 6707712 B2 | | 6/2020 | |
| KR | 20180076240 | * | 7/2018 | ............... H02N 1/04 |
| TW | 201212515 A | | 3/2012 | |

OTHER PUBLICATIONS

Taiwan Patent Office "Office Action wth search report" issued on Mar. 7, 2024, Taiwan.
Luo et al. "Direct-Current Triboelectric Nanogenerator Realized by Air Breakdown Induced Ionized Air Channel", 2018, Advanced Energy Materials, Wiley-VCH Verlag GmbH& Co. KGaA, Weinheim.
Lai et al. "Waterproof-Fabric-Based Multifunctional Triboelectric Nanogenerator for Universally Harvesting Energy from Raindrops, Wind, and Human Motions and as Self-Powered Sensors", 2019, Advanced Science, Wiley-VCH Verlag GmbH& Co. KGaA, Weinheim.

* cited by examiner

SELF-DRIVEN POWER GENERATION MODULE AND MANUFACTURING METHOD THEREOF

BACKGROUND

1. Field of the Disclosure

The present disclosure relates to a self-driven power generation module and a manufacturing method thereof.

2. Description of the Related Art

It is known that the electric energy generated by a self-driven power generation module is generally alternating current. Electronic components such as rectifiers must be added if they are to be used for charging capacitor equipment. This implies that when designing the module, more space needs to be reserved to accommodate hard and large electronic components and circuits, increasing the difficulty of module design and significantly increasing the production cost.

SUMMARY

In some embodiments, a self-driven power generation module includes an upper structure, a lower structure, and a charge accumulation layer. The upper structure includes a first encapsulating layer, a first supporting layer, and a first electrode layer. The first supporting layer contacts the first encapsulating layer. The first electrode layer contacts the first supporting layer. The lower structure is spaced apart from the upper structure. The lower structure includes a second encapsulating layer, a second supporting layer, a second electrode layer, a third supporting layer, and a third electrode layer. The second supporting layer is disposed on the second encapsulating layer. The second electrode layer is disposed on the second supporting layer. The third supporting layer is disposed on the second encapsulating layer and spaced apart from the second supporting layer. The third electrode layer is disposed on the third supporting layer. The charge accumulation layer is disposed between the upper structure and the lower structure.

In some embodiments, a manufacturing method of a self-driven power generation module includes: providing a first laminated structure, a second laminated structure and a third laminated structure, wherein the first laminated structure includes a first supporting layer, a first electrode layer formed on the first supporting layer, and a charge accumulation layer formed on the first electrode layer, the second laminated structure includes a second supporting layer and a second electrode layer formed on the second supporting layer, and the third laminated structure includes a third supporting layer and a third electrode layer formed on the third supporting layer; attaching the first laminated structure on a first encapsulating layer to form an upper structure; attaching the second laminated structure and the third laminated structure on a second encapsulating layer to form a lower structure; and enabling the charge accumulation layer to face the second electrode layer of the second laminated structure and the upper structure to be spaced apart from the lower structure to obtain the self-driven power generation module.

BRIEF DESCRIPTION OF THE DRAWINGS

Aspects of some embodiments of the present disclosure are readily understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1:
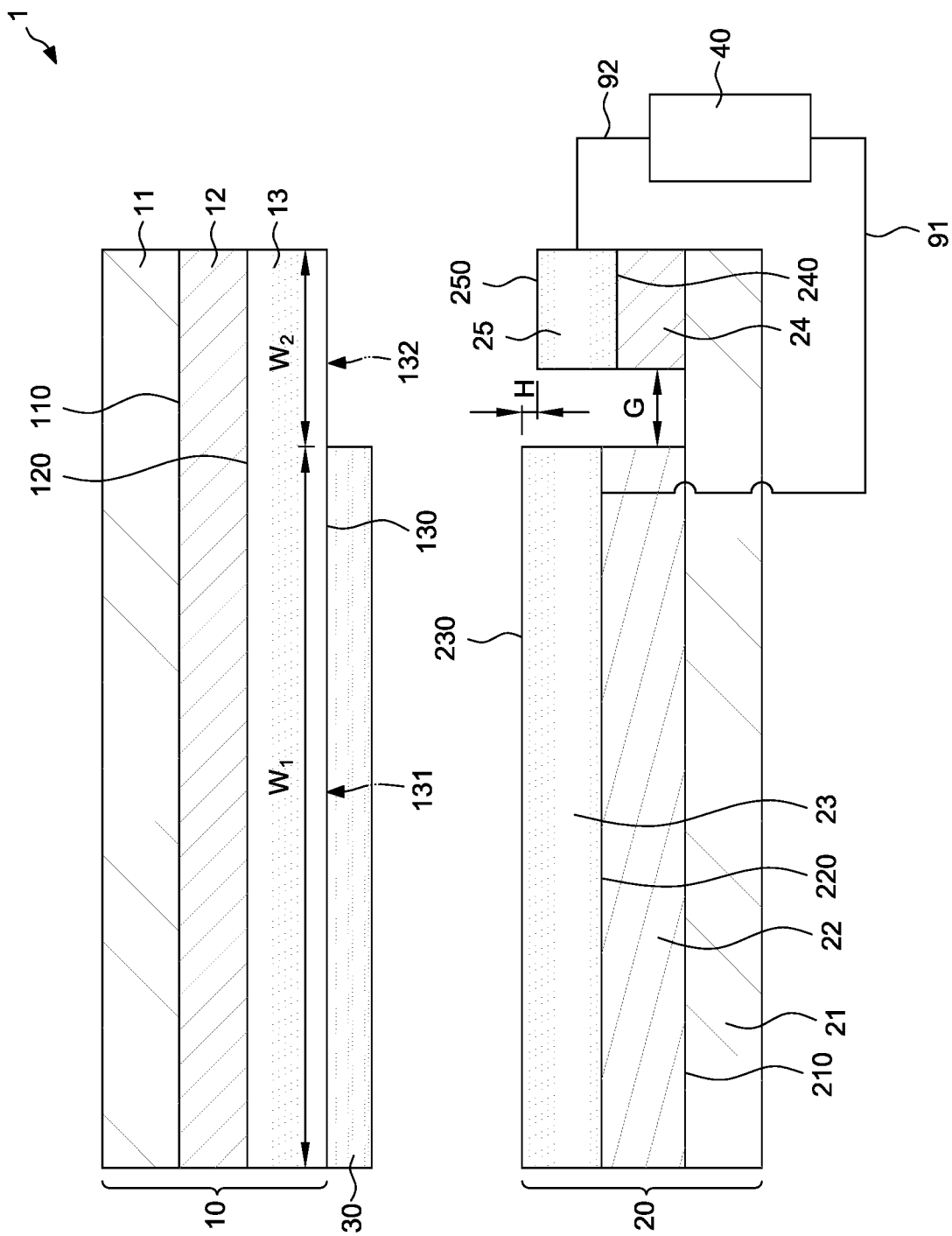
FIG. 1 illustrates a schematic cross-sectional view of a self-driven power generation module according to some embodiments of the present disclosure.

Referring to FIG. 1, which illustrates a schematic cross-sectional view of a self-driven power generation module 1 according to some embodiments of the present disclosure. The self-driven power generation module 1 of the present disclosure includes an upper structure 10, a lower structure 20, a charge accumulation layer 30 and an electronic component 40.

In some embodiments, the upper structure 10 may include a first encapsulating layer 11, a first supporting layer 12, and a first electrode layer 13. In some embodiments, the first encapsulating layer 11 may be made of a wear-resistant material and may be in a cloth or film state. In some embodiments, the first encapsulating layer 11 may include, but is not limited to, woven fabric.

The first supporting layer 12 contacts the first encapsulating layer 11. In some embodiments, the first supporting layer 12 may be disposed on a lower surface 110 of the first encapsulating layer 11. The first supporting layer 12 may be made of an elastic polymer material. In some embodiments, the first supporting layer 12 may include, but is not limited to, polyurethane (PU) foam or rubber foam. In some embodiments, the rubber foam may include, but is not limited to, styrene-butadiene rubber (SBR) foam.

The first electrode layer 13 contacts the first supporting layer 12. In some embodiments, the first electrode layer 13 may be disposed on a lower surface 120 of the first supporting layer 12. The first electrode layer 13 may be made of a conductive material. Therefore, in some embodiments, the first electrode layer 13 may also be referred to as the "first conductive layer." In some embodiments, the first electrode layer 13 may include, but is not limited to, a conductive cloth, a conductive thin film or a soft metal foil. In some embodiments, as shown in FIG. 1, the first electrode layer 13 has a lower surface 130. The lower surface 130 may define an unexposed area 131 and an exposed area 132. In a cross-sectional view, a width W2 of the exposed area 132 may be less than a width W1 of the unexposed area 131.

The lower structure 20 is spaced apart from the upper structure 10, that is, a distance is formed between the lower structure 20 and the upper structure 10. In some embodiments, the lower structure 20 may include a second encapsulating layer 21, a second supporting layer 22, a second electrode layer 23, a third supporting layer 24, and a third electrode layer 25.

The second encapsulating layer 21 may be made of a wear-resistant material and may be in a cloth or film state. In some embodiments, the second encapsulating layer 21 may include, but is not limited to, woven fabric. In some embodiments, a thickness of the second encapsulating layer 21 may be the same as a thickness of the first encapsulating layer 11. In addition, in a cross-sectional view, as shown in FIG. 1, a width of the second encapsulating layer 21 may be the same as a width of the first encapsulating layer 11. In some embodiments, a material of the second encapsulating layer 21 may be the same as a material of the first encapsulating layer 11.

The second supporting layer 22 is disposed on the second encapsulating layer 21. In some embodiments, the second supporting layer 22 may be disposed on an upper surface 210 of the second encapsulating layer 21. The second supporting layer 22 may be made of an elastic polymer material. In some embodiments, the second supporting layer 22 may include, but is not limited to, polyurethane (PU) foam or rubber foam. In some embodiments, the rubber foam may include, but is not limited to, styrene butadiene rubber (SBR) foam. In some embodiments, a thickness of the second supporting layer 22 may be greater than or equal to a thickness of the first supporting layer 12. In addition, in the cross-sectional view, as shown in FIG. 1, a width of the second supporting layer 22 may be less than a width of the first supporting layer 12. In some embodiments, a material of the second supporting layer 22 may be the same as a material of the first supporting layer 12. In some embodiments, the material of the second supporting layer 22 may be different from the material of the first supporting layer 12.

The second electrode layer 23 is disposed on the second supporting layer 22. In some embodiments, the second electrode layer 23 may be disposed on an upper surface 220 of the second supporting layer 22. The second electrode layer 23 may be made of a conductive material. Therefore, in some embodiments, the second electrode layer 23 may also be referred to as the "second conductive layer." In some embodiments, the second electrode layer 23 may include, but is not limited to, a conductive cloth, a conductive thin film or a soft metal foil. In some embodiments, the second electrode layer 23 may be used as a negative electrode. In some embodiments, a thickness of the second electrode layer 23 may be the same as a thickness of the first electrode layer 13. In addition, in the cross-sectional view, as shown in FIG. 1, a width of the second electrode layer 23 may be less than a width of the first electrode layer 13. In some embodiments, a material of the second electrode layer 23 may be the same as a material of the first electrode layer 13.

The third supporting layer 24 is disposed on the second encapsulating layer 21. In some embodiments, the third supporting layer 24 may be disposed on the upper surface 210 of the second encapsulating layer 21. In some embodiments, the third supporting layer 24 may be spaced apart from the second supporting layer 22, and as shown in FIG. 1, a distance G is formed between the third supporting layer 24 and the second supporting layer 22. In some embodiments, the distance G may be 0.1 mm to 30 mm. The third supporting layer 24 may be made of an elastic polymer material. In some embodiments, the third supporting layer 24 may include, but is not limited to, polyurethane (PU) foam or rubber foam. In some embodiments, the rubber foam may include, but is not limited to, styrene butadiene rubber (SBR) foam. In some embodiments, a thickness of the third supporting layer 24 may be less than the thickness of the second supporting layer 22. In addition, in the cross-sectional view, as shown in FIG. 1, a width of the third supporting layer 24 may be less than the width of the second supporting layer 22, and the width of the third supporting layer 24 may be greater than the distance G. In some embodiments, a material of the third supporting layer 24 may be the same as the material of the second supporting layer 22. In some embodiments, the material of the third supporting layer 24 may be different from the material of the second supporting layer 22. In some embodiments, the material of the third supporting layer 24 may be the same as the material of the first supporting layer 12. In some embodiments, the material of the third supporting layer 24 may be different from the material of the first supporting layer 12.

The third electrode layer 25 is disposed on the third supporting layer 24. In some embodiments, the third electrode layer 25 may be disposed on an upper surface 240 of the third supporting layer 24. The third electrode layer 25 is spaced apart from the second electrode layer 23, and as shown in FIG. 1, the distance G is formed between the third electrode layer 25 and the second electrode layer 23. The third electrode layer 25 may be made of a conductive material. Therefore, in some embodiments, the third electrode layer 25 may also be referred to as the "third conductive layer." In some embodiments, the third electrode layer 25 may include, but is not limited to, a conductive cloth, a conductive film or a soft metal foil. In some embodiments, the third electrode layer 25 may be used as a positive electrode. In some embodiments, a thickness of the third electrode layer 25 may be the same as the thickness of the first electrode layer 13. In addition, in the cross-sectional view, as shown in FIG. 1, an upper surface 250 of the third electrode layer 25 is lower than an upper surface 230 of the second electrode layer 23, that is, there is a height difference H between the upper surface 250 of the third electrode layer 25 and the upper surface 230 of the second electrode layer 23. In some embodiments, the height difference H may be 0.01 mm to 0.5 mm. In some embodiments, a width of the third electrode layer 25 may be the same as the width of the third supporting layer 24, and a lateral surface of the third electrode layer 25 may be substantially coplanar with a lateral surface of the third supporting layer 24. In some embodiments, the width of the third electrode layer 25 may be less than the width of the first electrode layer 13 and the width of the second electrode layer 23, and the width of the third electrode layer 25 may be greater than the distance G. In some embodiments, a material of the third electrode layer 25 may be the same as the material of the first electrode layer 13 and the material of the second electrode layer 23. In some embodiments, the exposed area 132 of the lower surface 130 of the first electrode layer 13 may face or be aligned with the third electrode layer 25.

The charge accumulation layer 30 is disposed between the upper structure 10 and the lower structure 20. In some embodiments, as shown in FIG. 1, the charge accumulation layer 30 may be disposed on the lower surface 130 of the first electrode layer 13 of the upper structure 10. In some embodiments, the charge accumulation layer 30 may cover the unexposed area 131 of the lower surface 130. In some embodiments, the charge accumulation layer 30 may include a high electronegative polymer material. In some embodiments, the charge accumulation layer 30 may include, but is not limited to, a fluorinated ethylene propylene (FEP) copolymer. In addition, the charge accumulation layer 30 may generate a charge accumulation effect through friction. Therefore, in some embodiments, the charge accumulation layer 30 may also be referred to as the "friction layer" or the "triboelectric layer."

In the cross-sectional view, as shown in FIG. 1, a width of the charge accumulation layer 30 may be less than the width of the first electrode layer 13. In some embodiments, the width of the charge accumulation layer 30 may be the same as the width of the second electrode layer 23, and a lateral surface of the charge accumulation layer 30 may be substantially coplanar with a lateral surface of the second electrode layer 23. In some embodiments, the third electrode layer 25 of the lower structure 20 may be located outside a downward projection area of the charge accumulation layer 30 so that the third electrode layer 25 is prevented from contacting the charge accumulation layer 30 to cause power generation failure.

The electronic component 40 is electrically connected to the second electrode layer 23 and the third electrode layer 25. In some embodiments, as shown in FIG. 1, the electronic component 40 may be electrically connected to the second electrode layer 23 through a first wire 91 and electrically connected to the third electrode layer 25 through a second wire 92. In some embodiments, the electronic component 40 may include, but is not limited to, a resistor or an electric storage device.

Figure 2:
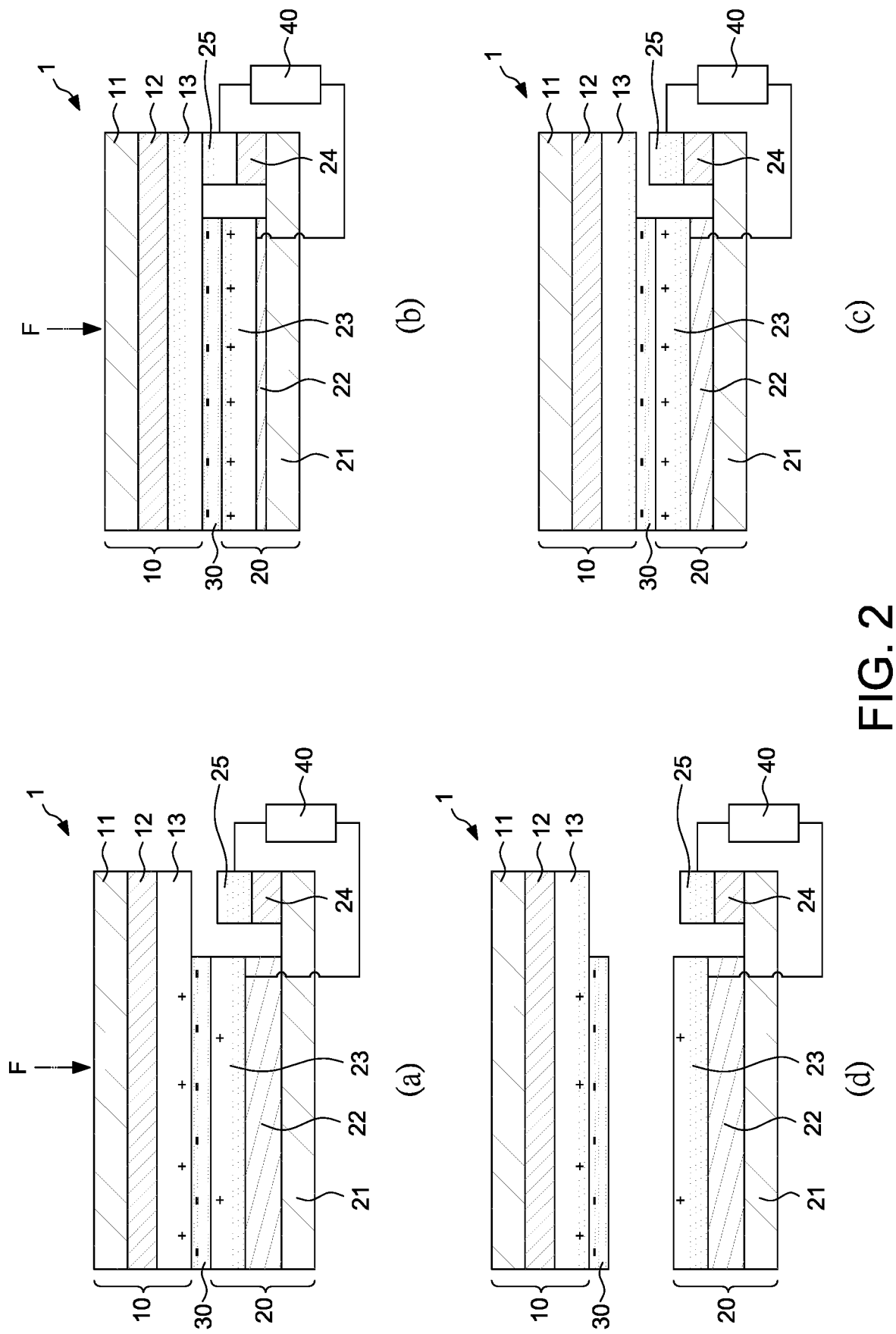
FIG. 2 illustrates a schematic action diagram of a self-driven power generation module according to some embodiments of the present disclosure.

Referring to FIG. 2, which illustrates a schematic action diagram of a self-driven power generation module 1 according to some embodiments of the present disclosure.

Referring to FIG. 2(a), an external force F is applied to the self-driven power generation module 1 to generate friction between the charge accumulation layer 30 and the second electrode layer 23. Since there is a difference in electronegativity between the charge accumulation layer 30 and the second electrode layer 23, an electrically opposite and durable electrostatic field will be generated on the surfaces of the both.

Referring to FIG. 2(b), the external force F is continuously increased on the self-driven power generation module 1 to bring the first electrode layer 13 into contact with the third electrode layer 25 to realize circuit conduction, and then electric energy is output. In this step, the external force F will gradually compress the second supporting layer 22 to reduce its thickness gradually. Meanwhile, the first electrode layer 13 will gradually approach the third electrode layer 25 until both are in full contact.

Referring to FIG. 2(c), the external force F is removed to separate the first electrode layer 13 from the third electrode layer 25. At the moment that the first electrode layer 13 is separated from the third electrode layer 25, a circuit is immediately disconnected to ensure that the output electric energy is the maximum value and to prevent the module from generating a reverse current in order to generate a usable direct current. The output of the electric energy and the conduction of the circuit depend on whether or not the first electrode layer 13 is in contact with the third electrode layer 25, indicating that the third electrode layer 25 has a switching characteristic. Therefore, in some embodiments, the third electrode layer 25 may also be referred to as the "switching layer" or the "switching electrode layer." In addition, along with removing the external force F, the thickness of the originally pressed second supporting layer 22 will gradually increase due to its own rebound characteristic.

Referring to FIG. 2(d), when the second supporting layer 22 recovers to the original thickness, and the charge accumulation layer 30 and the second electrode layer 23 return to the original positions, an electric energy output cycle is completed.

By continuously repeating the step cycle from FIG. 2(a) to FIG. 2(d), the electrostatic field will continuously change so that the self-driven power generation module 1 of the present disclosure can continuously output the direct current. In addition, the direct current output from the self-driven power generation module 1 has a large instantaneous current that can directly drive a light-emitting diode (LED) or directly charge a capacitor without needing an additional circuit. In some embodiments, the self-driven power generation module 1 of the present disclosure may guide the direct current generated when the electrostatic field changes to a load through an external circuit so that the generated electric energy can be more widely applied. Furthermore, the self-driven power generation module 1 of the present disclosure does not cause any pollution in the power generation process and is an inexhaustible green energy source.

Referring to FIG. 1 again, the self-driven power generation module 1 of the present discourse is small in size and may be directly applied to insoles. An external force is applied to the self-driven power generation module 1 by walking or running actions so that friction is continuously performed between the charge accumulation layer 30 and the second electrode layer 23, and the first electrode layer 13 and the third electrode layer 25 are in power generation circulation of continuous contact and separation. Moreover, the outputted direct current may directly drive a decorative light-emitting diode (LED) on a vamp.

Figure 3:
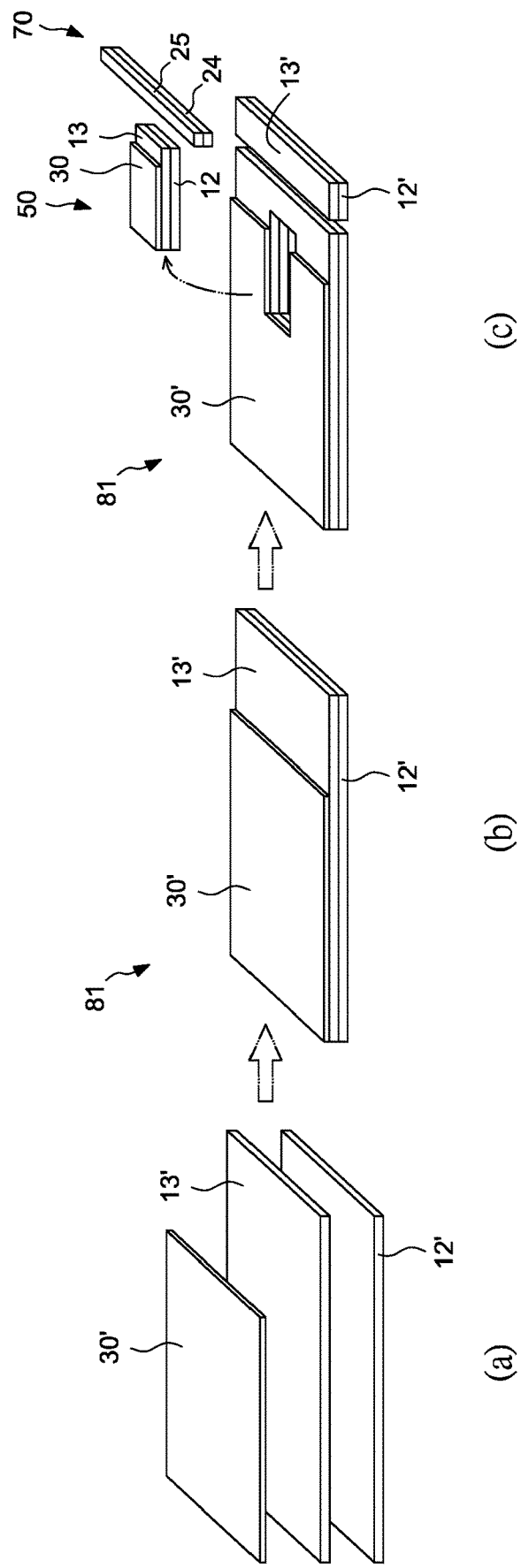
FIG. 3 illustrates a schematic view of one or more stages of some embodiments of a manufacturing method of a self-driven power generation module according to the present disclosure.
Figure 4:
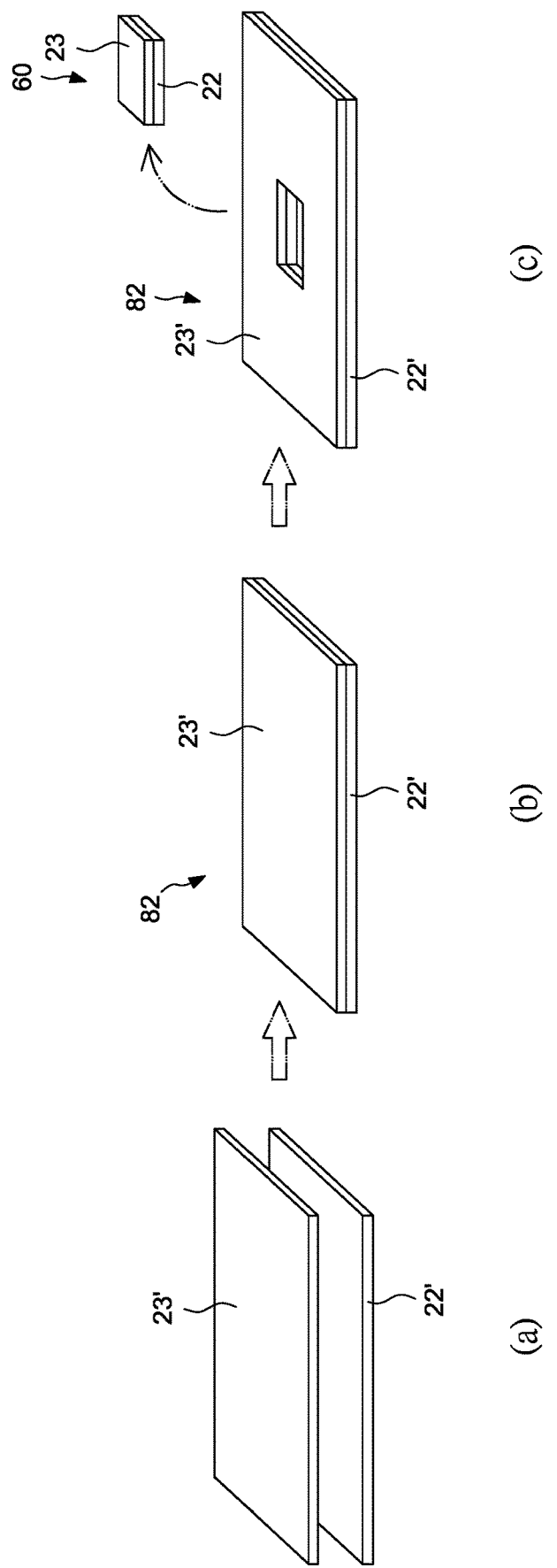
FIG. 4 illustrates a schematic view of one or more stages of some embodiments of a manufacturing method of a self-driven power generation module according to the present disclosure.
Figure 5:
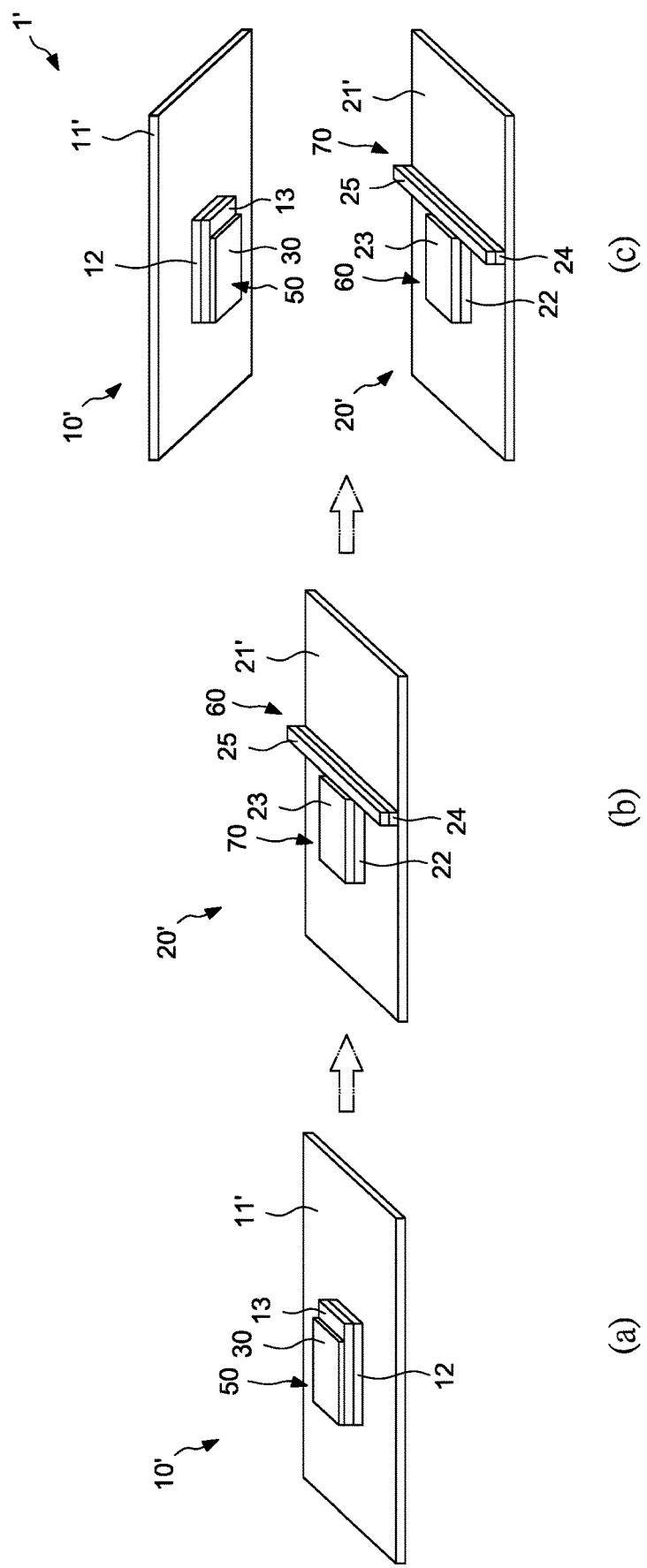
FIG. 5 illustrates a schematic view of one or more stages of some embodiments of a manufacturing method of a self-driven power generation module according to the present disclosure.

FIG. 3 through FIG. 5 are schematic views of one or more stages of some embodiments of a manufacturing method of a self-driven power generation module according to the present disclosure.

Referring to FIG. 3 and FIG. 4, a first laminated structure 50, a second laminated structure 60 and a third laminated structure 70 are provided.

The manufacturing methods of the first laminated structure 50 and the third laminated structure 70 are described as follows.

Referring to FIG. 3(a), a supporting layer 12', an electrode layer 13' and a charge accumulation layer 30' are provided. The supporting layer 12' of FIG. 3(a) may be the same as the first supporting layer 12 of FIG. 1, and the difference is only in size. In some embodiments, the size of the supporting layer 12' may be 10 cm×10 cm, the thickness may be 0.5 mm to 3 mm, and the supporting layer 12' may be made of styrene butadiene rubber (SBR) foam. The electrode layer 13' of FIG. 3(a) may be the same as the first electrode layer 13 of FIG. 1, and the difference is only in size. In some embodiments, the size of the electrode layer 13' may be 10 cm×10 cm, the thickness may be 10 μm to 100 μm, and the electrode layer 13' may be made of a conductive cloth. The charge accumulation layer 30' of FIG. 3(a) may be the same as the charge accumulation layer 30 of FIG. 1, and the difference is only in size. In some embodiments, the size of the charge accumulation layer 30' may be 10 cm×6 cm, the thickness may be 0.05 mm to 2 mm, and the charge accumulation layer 30' may be made of fluorinated ethylene propylene (FEP) copolymer.

Referring to FIG. 3(b), the supporting layer 12', the electrode layer 13' and the charge accumulation layer 30' are laminated together in a hot-pressing manner by a laminating machine to form a three-layer laminated structure 81.

Referring to FIG. 3(c), the three-layer laminated structure 81 is cut to obtain the first laminated structure 50 (the size of which is 6 cm×8 cm) and the third laminated structure 70 (the size of which is 6 cm×1 cm). The first laminated structure 50 includes the first supporting layer 12, the first electrode layer 13 formed on the first supporting layer 12, and the charge accumulation layer 30 formed on the first electrode layer 13. The third laminated structure 70 includes the third supporting layer 24 and the third electrode layer 25 formed on the third supporting layer 24.

The manufacturing method of the second laminated structure 60 is described as follows.

Referring to FIG. 4(a), a supporting layer 22' and an electrode layer 23' are provided. The supporting layer 22' of FIG. 4(a) may be the same as the second supporting layer 22 of FIG. 1, and the difference is only in size. In some embodiments, the size of the supporting layer 22' may be 8 cm×8 cm, the thickness may be 1 mm to 5 mm, and the supporting layer 22' may be made of rubber foam. The electrode layer 23' of FIG. 4(a) may be the same as the second electrode layer 23 of FIG. 1, and the difference is only in size. In some embodiments, the size of the electrode layer 23' may be 8 cm×8 cm, the thickness may be 10 μm to 100 μm, and the electrode layer 23' may be made of a conductive cloth.

Referring to FIG. 4(b), the supporting layer 22' and the electrode layer 23' are laminated together in the hot-pressing manner by the laminating machine to form a double-layer laminated structure 82.

Referring to FIG. 4(c), the double-layer laminated structure 82 is cut to obtain the second laminated structure 60 (the size of which is 6 cm×6 cm). The second laminated structure 60 includes the second supporting layer 22 and the second electrode layer 23 formed on the second supporting layer 22.

Referring to FIG. 5(a), the first laminated structure 50 is attached on a first encapsulating layer 11' to form an upper structure 10'.

Referring to FIG. 5(b), the second laminated structure 60 and the third laminated structure 70 are attached on a second encapsulating layer 21' to form a lower structure 20'. In some embodiments, a distance between the second laminated structure 60 and the third laminated structure 70 may be 0.1 cm to 2 cm.

Referring to FIG. 5(c) and FIG. 1, the charge accumulation layer 30 faces the second electrode layer 23 of the second laminated structure 60, and the upper structure 10' is spaced apart from the lower structure 20' to obtain a self-driven power generation module 1'. Finally, the self-driven power generation module 1' is cut to obtain the self-driven power generation module 1 as shown in FIG. 1. In some embodiments, as shown in FIG. 1, the second electrode layer 23 and the third electrode layer 25 may be electrically connected through the electronic component 40. In some embodiments, the electronic component 40 may be electrically connected to the second electrode layer 23 through the first wire 91 and electrically connected to the third electrode layer 25 through the second wire 92. In some embodiments, the self-driven power generation module 1' of FIG. 5(c) may not be cut according to use requirements.

Figure 6:
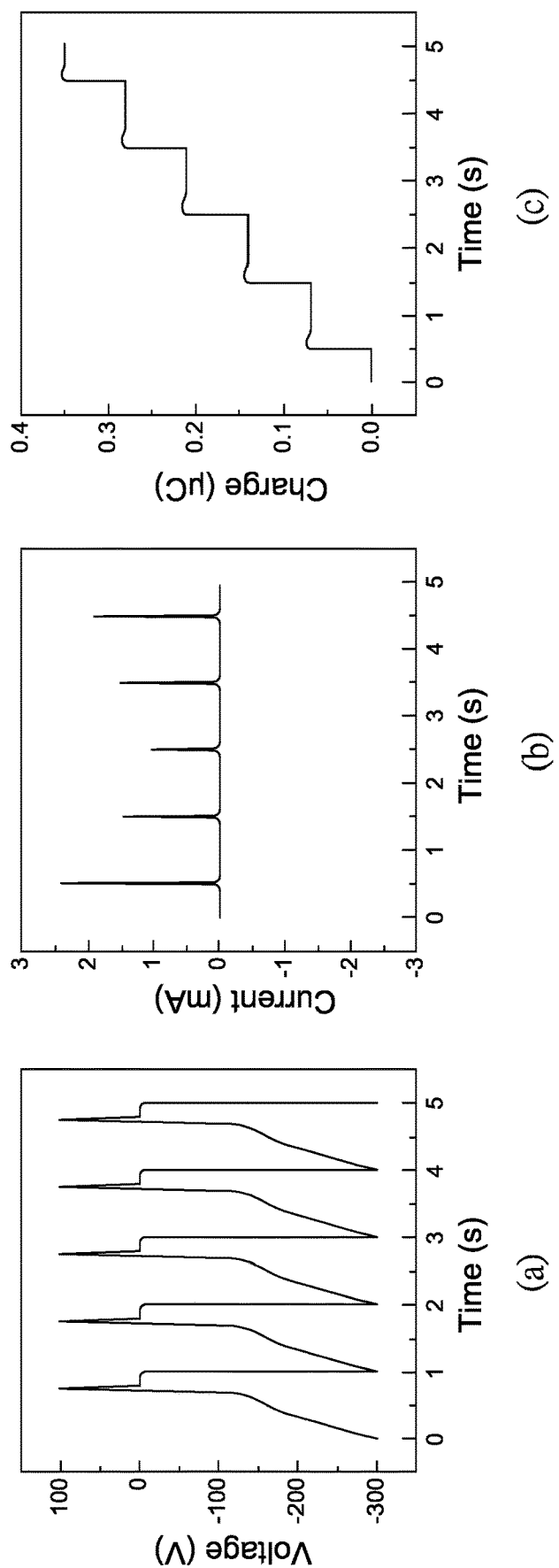
FIG. 6 illustrates an electrical detection result diagram of a self-driven power generation module according to the present disclosure.

Referring to FIG. 6, which illustrates an electrical detection result diagram of a self-driven power generation module 1 according to the present disclosure. FIG. 6(a) illustrates a time-dependent output voltage detection result of the self-driven power generation module 1, and the measured maximum voltage is about 300 V. FIG. 6(b) illustrates a time-dependent output current detection result of the self-driven power generation module 1, and a direct current of about 2.5 mA may be generated. FIG. 6(c) illustrates a time-dependent charge transfer detection result of the self-driven power generation module 1, which is direct current charge conversion.

Figure 7:
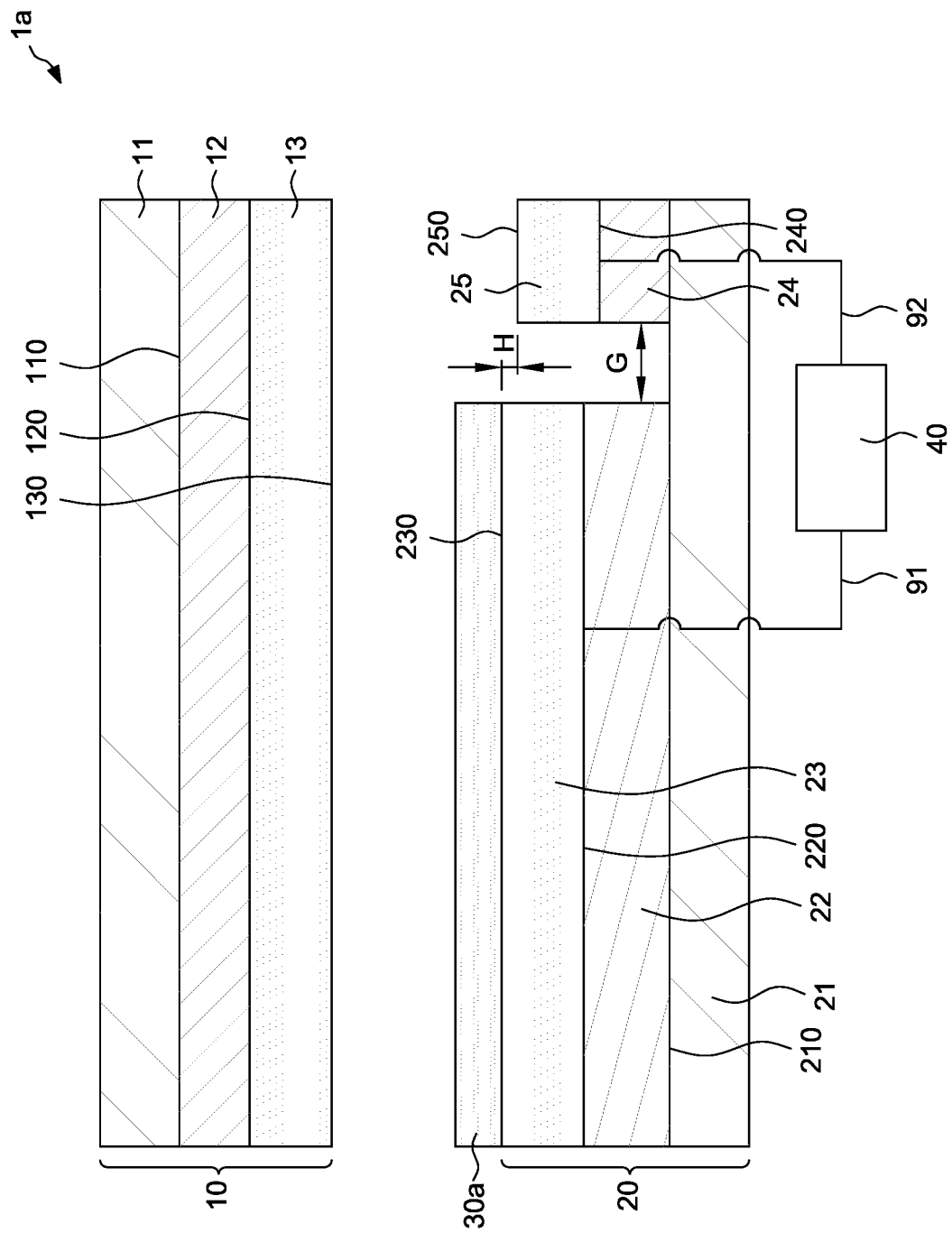
FIG. 7 illustrates a schematic cross-sectional view of a self-driven power generation module according to some embodiments of the present disclosure.

Referring to FIG. 7, which illustrates a schematic cross-sectional view of a self-driven power generation module 1a according to some embodiments of the present disclosure. The self-driven power generation module 1a of FIG. 7 is similar to the structure of the self-driven power generation module 1 of FIG. 1, and the difference is only a position of a charge accumulation layer 30a of the self-driven power generation module 1a of FIG. 7. In some embodiments, as shown in FIG. 7, the charge accumulation layer 30a may be disposed on the upper surface 230 of the second electrode layer 23.

Figure 8:
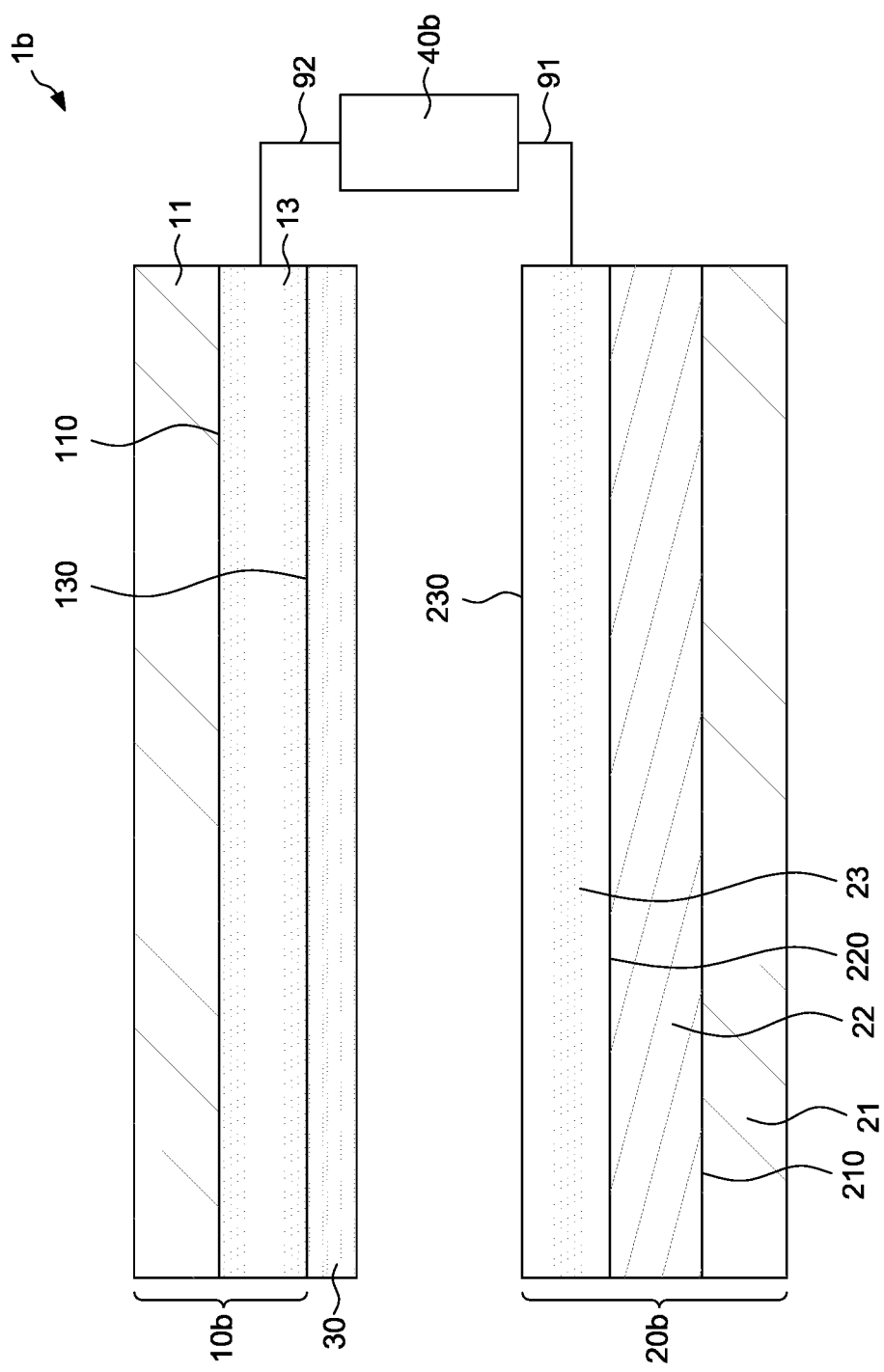
FIG. 8 illustrates a schematic cross-sectional view of a self-driven power generation module according to some embodiments of the present disclosure.

Referring to FIG. 8, which illustrates a schematic cross-sectional view of a self-driven power generation module 1b according to some embodiments of the present disclosure. The self-driven power generation module 1b of FIG. 8 is similar to the structure of the self-driven power generation module 1 of FIG. 1, and the difference is only that the self-driven power generation module 1b of FIG. 8 simplifies an upper structure 10b and a lower structure 20b. In some embodiments, as shown in FIG. 8, the upper structure 10b omits the first supporting layer 12 compared to the upper structure 10 of FIG. 1. The lower structure 20b omits the third supporting layer 24 and the third electrode layer 25 compared to the lower structure 20 of FIG. 1. In addition, an electronic component 40b of FIG. 8 is changed to be electrically connected to the second electrode layer 23 and the first electrode layer 13.

While several embodiments of the present disclosure have been illustrated and described, various modifications and improvements can be made by those skilled in the art. The embodiments of the present disclosure are therefore described in an illustrative but not in a restrictive sense. It is intended that the present disclosure should not be limited to the particular forms as illustrated and that all modifications which maintain the spirit and scope of the present disclosure are within the scope defined in the appended claims.

What is claimed is:

1. A self-driven power generation module, comprising:
   an upper structure, comprising:
      a first encapsulating layer;
      a first supporting layer contacting the first encapsulating layer; and
      a first electrode layer contacting the first supporting layer;
   a lower structure spaced apart from the upper structure, and the lower structure comprising:
      a second encapsulating layer;
      a second supporting layer disposed on the second encapsulating layer;
      a second electrode layer disposed on the second supporting layer;
      a third supporting layer disposed on the second encapsulating layer and spaced apart from the second supporting layer; and
      a third electrode layer disposed on the third supporting layer; and
   a charge accumulation layer disposed between the upper structure and the lower structure.

2. The self-driven power generation module of claim 1, further comprising:

an electronic component electrically connected to the second electrode layer and the third electrode layer.

3. The self-driven power generation module of claim 1, wherein the third electrode layer is located outside a downward projection area of the charge accumulation layer.

4. The self-driven power generation module of claim 1, wherein the charge accumulation layer is disposed on a lower surface of the first electrode layer.

5. The self-driven power generation module of claim 4, wherein the lower surface of the first electrode layer defines an unexposed area and an exposed area, the charge accumulation layer covers the unexposed area, and the exposed area faces the third electrode layer.

6. The self-driven power generation module of claim 1, wherein the charge accumulation layer includes a high electronegative polymer material.

7. The self-driven power generation module of claim 1, wherein an upper surface of the third electrode layer is lower than an upper surface of the second electrode layer.

8. The self-driven power generation module of claim 1, wherein the third electrode layer is spaced apart from the second electrode layer.

9. A manufacturing method of a self-driven power generation module, comprising:
providing a first laminated structure, a second laminated structure and a third laminated structure, wherein the first laminated structure includes a first supporting layer, a first electrode layer formed on the first supporting layer, and a charge accumulation layer formed on the first electrode layer, the second laminated structure includes a second supporting layer and a second electrode layer formed on the second supporting layer, and the third laminated structure includes a third supporting layer and a third electrode layer formed on the third supporting layer;
attaching the first laminated structure on a first encapsulating layer to form an upper structure;
attaching the second laminated structure and the third laminated structure on a second encapsulating layer to form a lower structure; and
enabling the charge accumulation layer to face the second electrode layer of the second laminated structure and the upper structure to be spaced apart from the lower structure to obtain the self-driven power generation module.

10. The manufacturing method of claim 9, further comprising:
electrically connecting the second electrode layer and the third electrode layer through an electronic component.

* * * * *